May 29, 1962 W. R. KELL 3,036,931
PIPE COATING PROCESS AND APPARATUS
Filed April 27, 1959 6 Sheets-Sheet 1

INVENTOR.
WALDO R. KELL
BY
Beehler & Shanahan
ATTORNEYS.

INVENTOR.
WALDO R. KELL
BY
Beehler & Shanahan
ATTORNEYS.

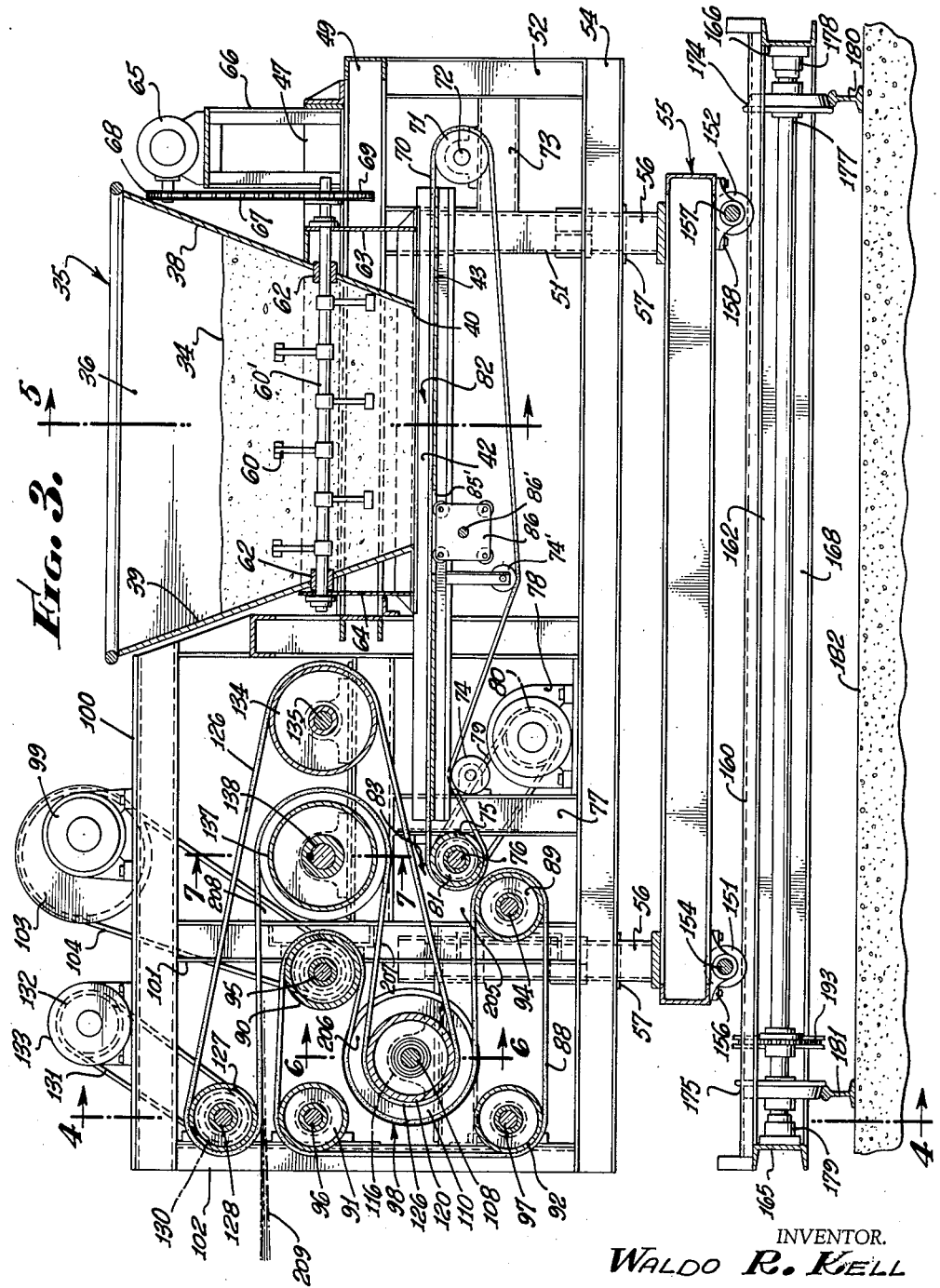

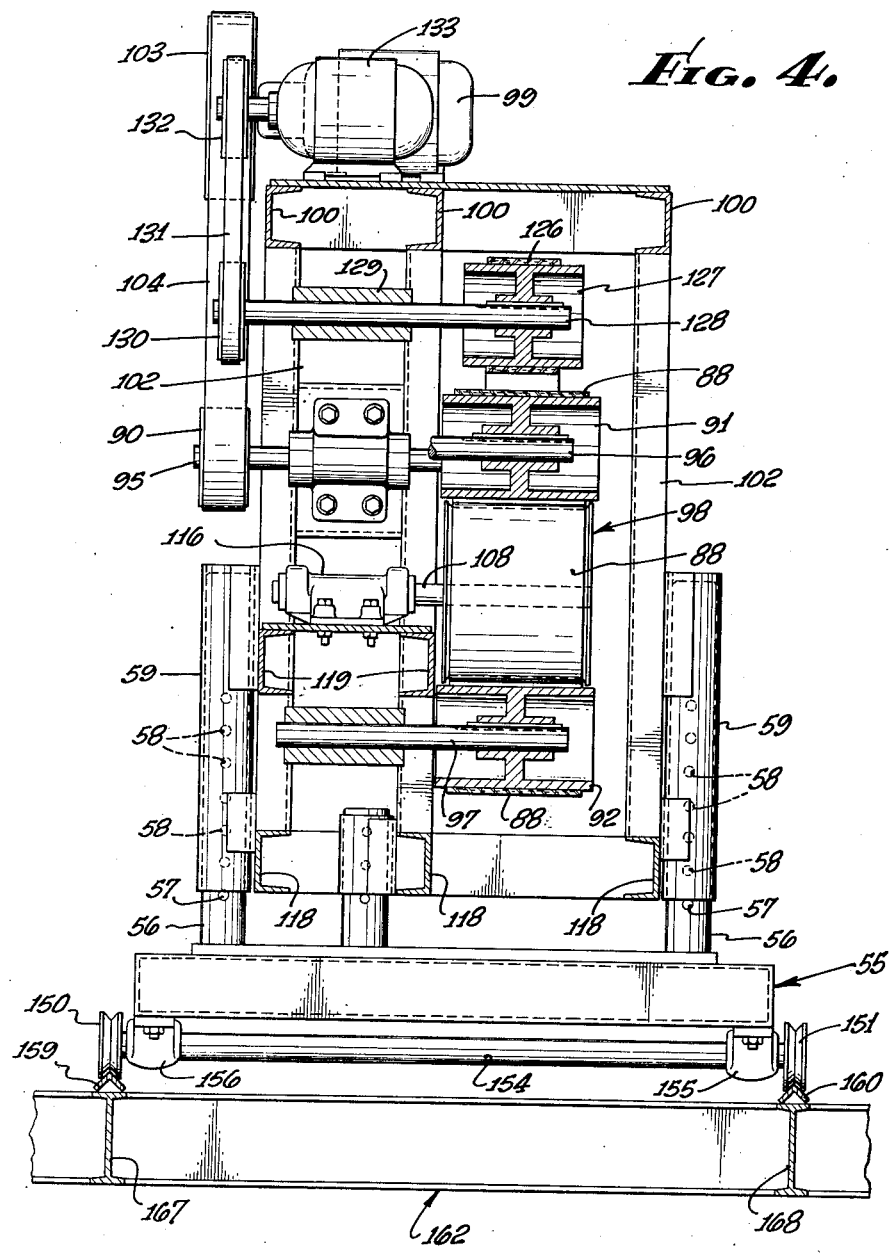

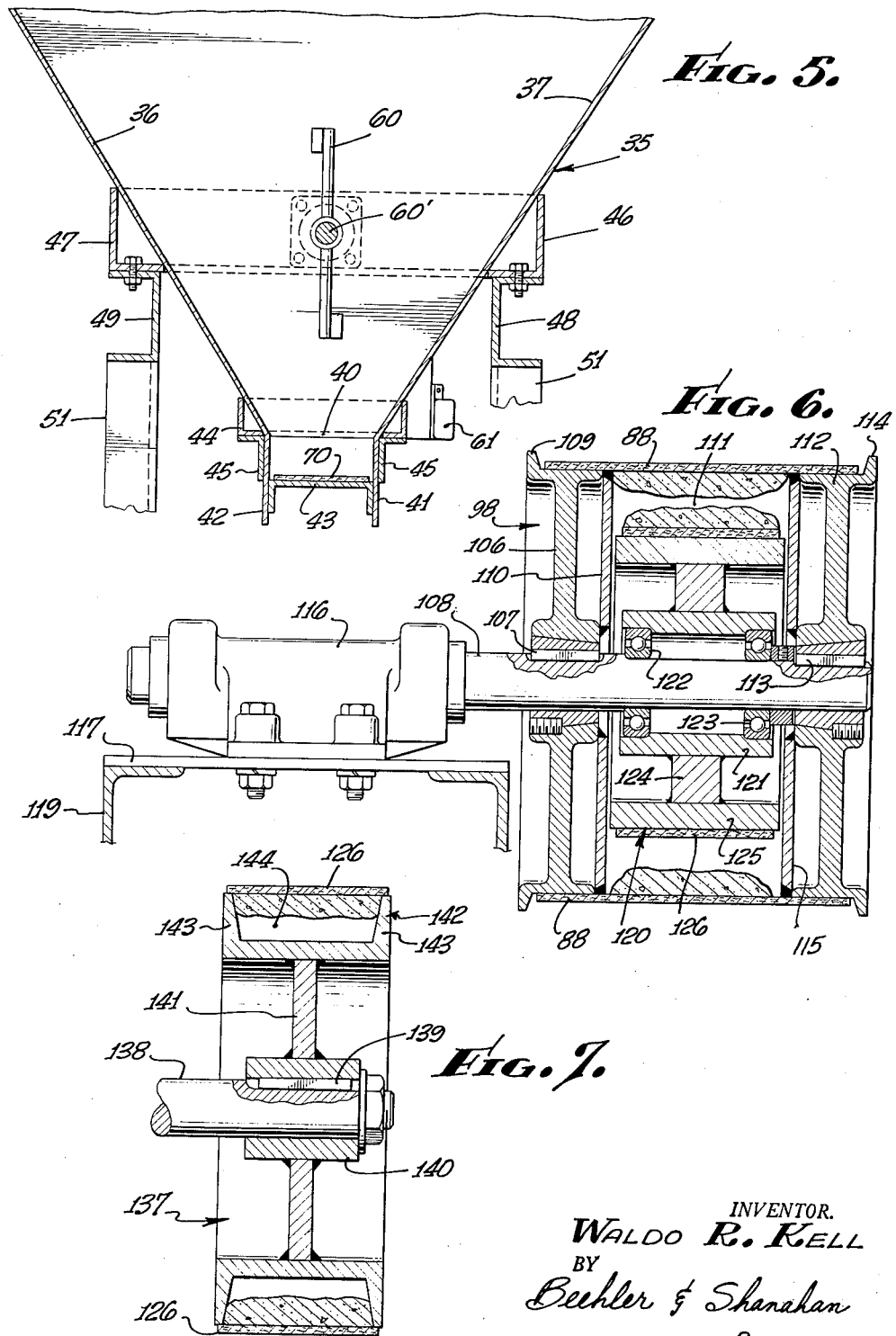

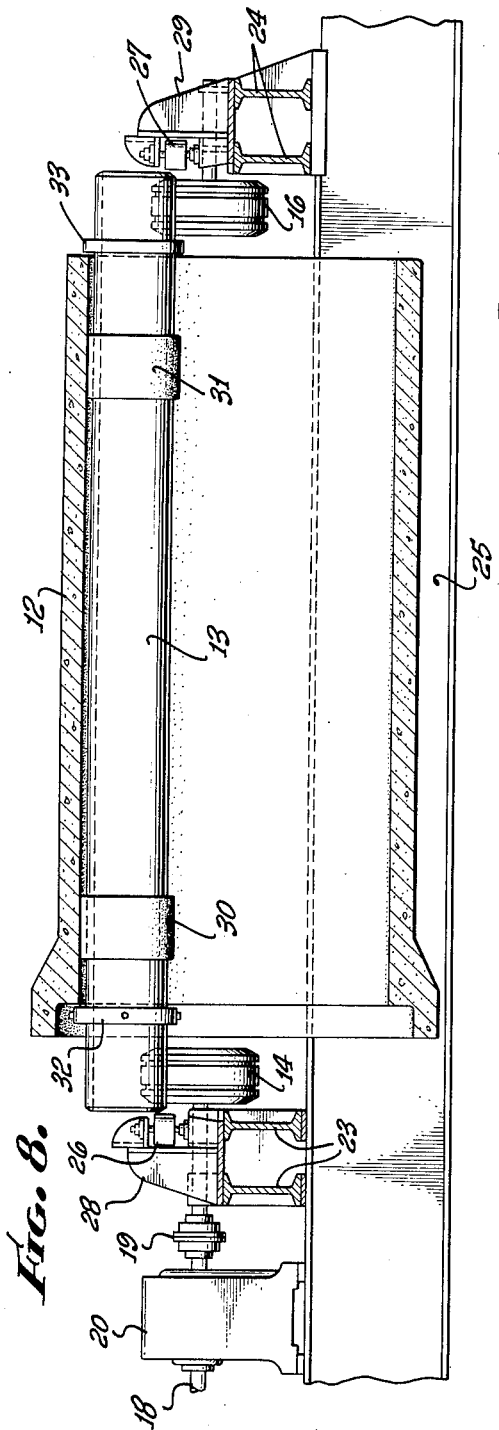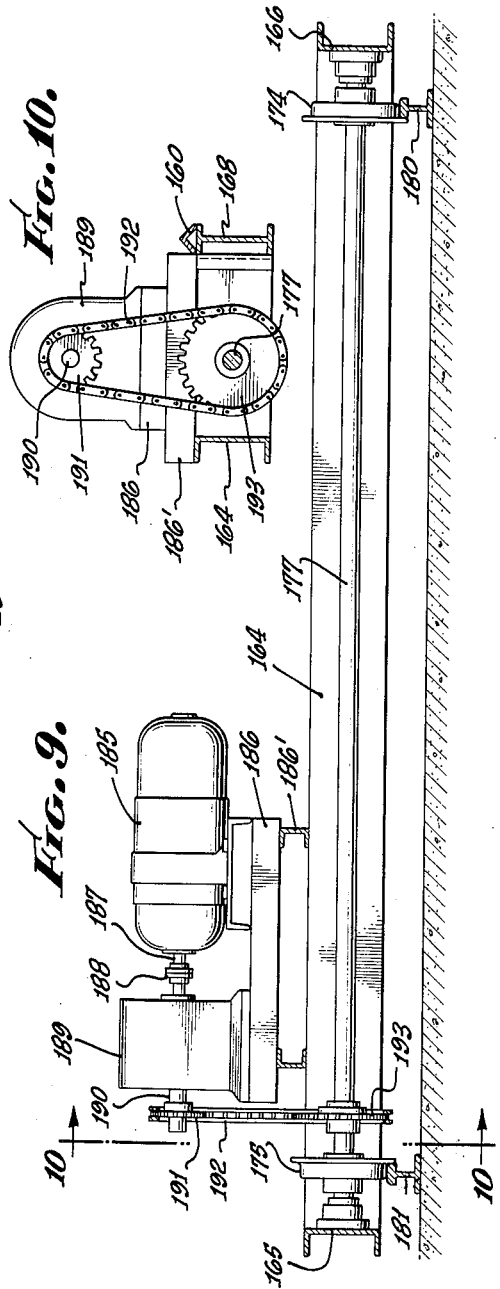

United States Patent Office 3,036,931
Patented May 29, 1962

3,036,931
PIPE COATING PROCESS AND APPARATUS
Waldo R. Keil, Bakersfield, Calif., assignor to Cen-Vi-Ro Pipe Corporation, Kern, Calif., a corporation of Delaware
Filed Apr. 27, 1959, Ser. No. 809,042
21 Claims. (Cl. 117—94)

The invention relates to coating machines with special emphasis on a machine by which a plastic coating material can be applied to the exterior surface of a cylindrical core at a progressive controlled rate in order to completely cover the exterior of the core in an effective and efficient manner.

The invention herein disclosed is directly pertinent to the coating of prestressed concrete pipe cores wherein the prestressing is accomplished by winding wire around the exterior of the core, the wire thereafter requiring a coating of appreciable depth to protect it from deterioration whereby to maintain the prestressing at full strength. Coatings usually applied consist of a cement grout sprayed upon the core with considerable force so as to penetrate recesses and crevices around the wire prestressed winding and to produce a depth of dependable coating material over the entire exterior.

By reason of the fact that the construction of prestressed concrete pipes is a relatively new art, there has been no more than a limited amount of development of machinery for applying coatings. Such development as has been evident heretoforce has borrowed very heavily from the known techniques which involve the spraying of cement grout on prepared surfaces, such as building walls, concrete abutments, reinforced swimming pools, etc. Although techniques heretofore employed have been capable of applying a covering so as to encase objects of whatever nature might need a coating, the character, size, and weight of concrete pipe cores has been such that standard techniques have not been productive of dependable lasting coatings of a completely acceptable kind. Goods of the type described, namely, concrete pipe cores, which may be as large as six feet in diameter or more and twenty feet in length, are massive and expensive. Furthermore, being cylindrical, they must be completely coated on all sides in one operation so that the coating will be homogeneous throughout its entire area in order to produce the best results.

It is therefore among the objects of the invention to provide a new and improved coating machine and method for cylindrical objects which is capable of rapidly and evenly coating the entire exterior surface of the cylindrical objects in a continuous, progressive operation.

Another object of the invention is to provide a new and improved coating machine and method for cylindrical objects such as prestressed pipe, and the like, where the coating material can be passed from an adequate common source with the material at rest and the velocity of the material rapidly built up to a very high velocity when thrown upon the cylindrical object, thereby to produce a coating having adequate density and penetrating characteristics when in place upon the cylindrical object.

Another object of the invention is to provide a new and improved pipe coating machine of ample capacity sufficient to contain and apply a quantity of coating material sufficient in amount to completely coat cylindrical objects of the largest diameter and greatest length available in one continuous coating operation.

A further object of the invention is to produce a new and improved pipe coating machine compact in character so that despite the presence of numerous material handling accelerators and an adequate container, the coating assembly can be mounted in convenient fashion adjacent the largest of the cylindrical objects coated and moved in such fashion throughout the length of the cylindrical object that all sides of the object from end to end are effectively coated in virtually a minimum amount of time.

A still further object of the invention is to provide a new and improved coating machine for pipes and similar cylindrical objects, the operating characteristics of which can be varied at will so that the same machine and same machine set-up can be used without substantial change even though pipes of considerably varied size may be presented to it, the machine, however, containing sufficient adjusting features to permit accurate control over the quantity, density and speed of application of the coating material as varied requirements are presented in the coating of different sizes of objects.

Also included among the objects of the invention is to provide a new and improved coating machine which is simple, rugged and effective in its pattern of construction so that substantial quantities of material can be handled rapidly over long periods of operation, the design being such that it will not become excessively dirty and clogged with partially hardened material and which furthermore is of such simple open construction that upon completion of its operation, it can be quickly and thoroughly cleaned.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

FIGURE 3 is a vertical sectional view of the coating machine taken on the line 3—3 of FIGURE 1.

FIGURE 4 is a transverse sectional view taken on the line 4—4 of FIGURE 3.

FIGURE 5 is a transverse sectional view taken on the line 5—5 of FIGURE 3.

FIGURE 6 is a transverse sectional view of an alternator pulley assembly taken on the line 6—6 of FIGURE 3.

FIGURE 7 is a transverse sectional view of a discharge pulley assembly taken on the line 7—7 of FIGURE 3.

FIGURE 8 is a longitudinal sectional view showing the mounting of a cylindrical concrete core which is to be coated.

FIGURE 9 is a fragmentary elevational view of the traction drive for the coating machine carriage taken on the line 9—9 of FIGURE 1.

FIGURE 10 is a cross-sectional view of the portion of the traction drive taken on the line 10—10 of FIGURE 9.

Figure 1:
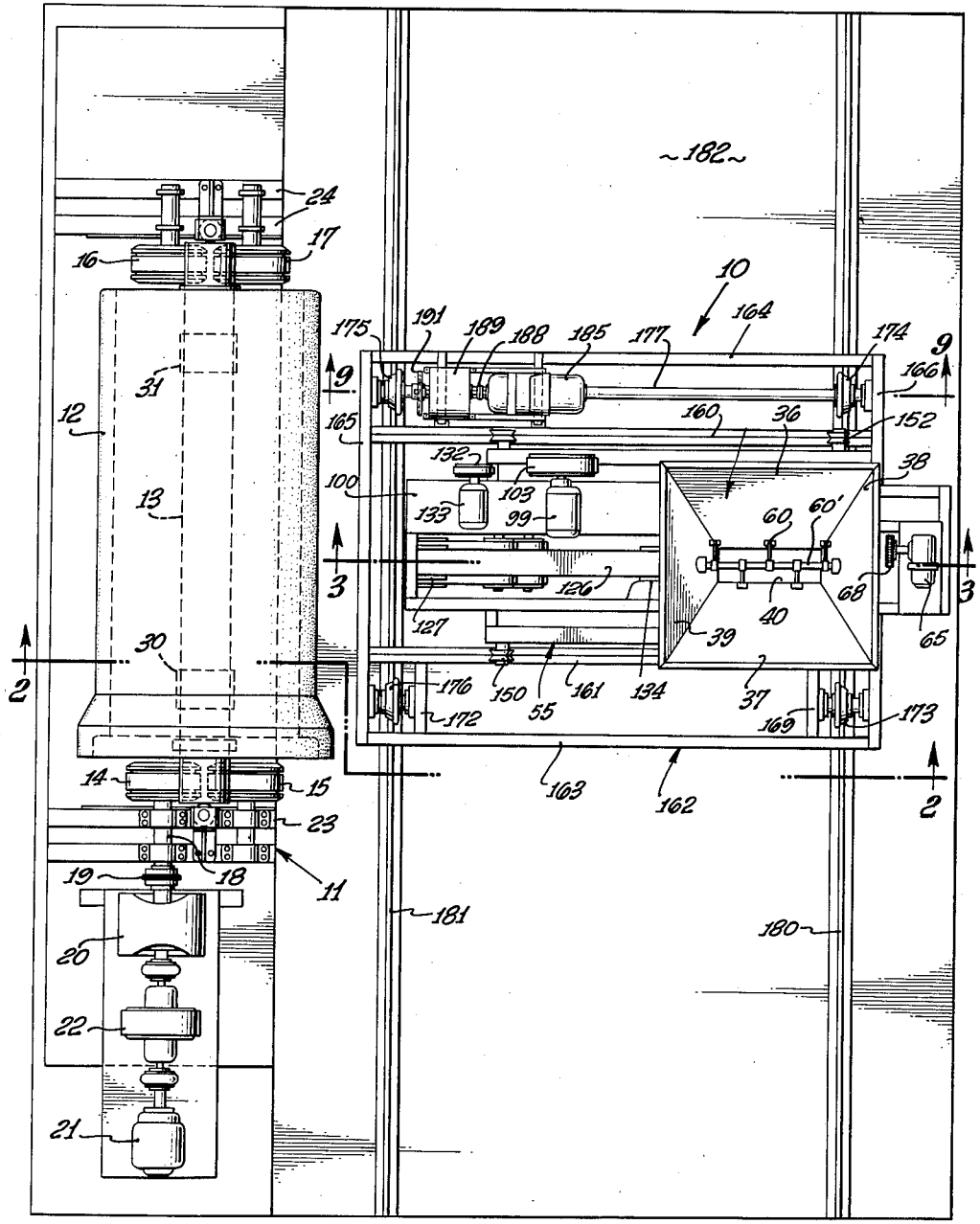
FIGURE 1 is a plan view of the coating machine shown in its relationship to a prestressed concrete pipe which is to be coated.

In one embodiment of the invention chosen only for the purpose of illustration, there is shown a coating machine for cylindrical objects such as molded concrete cores mounted in association with a concrete core and requisite machinery for locating and rotating in the core during operation of the coating machine. In general the coating machine is indicated by the reference character 10 and the pipe supporting mechanism by reference character 11. A cylindrical object here having the form of a bell and spigot molded prestressed concrete pipe 12 is shown in position to be coated.

To take full advantage of the conveniences and advantages inherent in the coating machine 10, the pipe 12 is shown supported by means of a mandrel 13 cradled in a pair of rollers 14, 15 at one end and a second pair of rollers 16, 17 at the other end. The roller 14 is mounted upon a drive shaft 18 coupled by a coupling 19 to a gear reducer 20 which in turn is driven by an electric motor 21 through a dynamatic clutch 22. The pipe supporting mechanism made reference to includes transverse beam assemblies 23 at one end and 24 at the other end carried by a framework 25. Thrust rollers 26 and 27 at opposite ends mounted respectively by means of brackets 28 and 29 contain the mandrel in a proper operating condition. Friction bands 30 and 31 on the mandrel provide traction for rotating the pipe when the motor 21 operates to drive the roller 14 and collars 32 and 33 at respectively opposite ends of the pipe when fastened to the mandrel hold the pipe axially in proper position. It will be understood that when the mandrel is rotated by the motor 21 at a speed selected by the dynamatic clutch 22, the mandrel rotates in the cradle provided by the rollers 14, 15, 16 and 17, and the pipe in turn rotates at a predetermined rate of speed.

Material 34, which will ultimately be thrown upon the exterior of the pipe to become the coating thereof, is contained within a hopper 35 consisting of side walls 36, 37 and end walls 38, 39 which slope toward the bottom and form an elongated rectangular opening 40. Below the opening are guards 41, 42 which overlie opposite sides of a belt-supporting guide or plate 43 spaced a distance below the opening 40. Sections 44 and 45 at the lower end of the hopper and on the exterior of the guards 41, 42 serve to contain and locate the bottom of the hopper.

Appropriate and conventional sections 46, 47 mounted respectively on beams 48, 49 in turn supported by columns 50, 51, 52 and 53 serve to secure the position of the hopper. The columns in turn are mounted upon beams 54. The beams 54 may be considered as comprising a mounting means for mounting the mechanical structure of the coating machine upon a carriage 55. The mounting means may be considered as comprising in addition a series of four vertical columns 56 anchored upon the carriage and extending upwardly into engagement with the beams 54 and other related structure, there being provided pins 57 insertable into apertures 58 at a selected elevation whereby casings 59, surrounding the columns and secured to the framework in general as indicated bearing upon the pins, serve to mount the entire coating machinery at a selected position of elevation. To change the position of elevation the pins 57 can be withdrawn from the holes 58 and replaced in new and higher holes.

Located within the hopper is an agitator 60, a shaft 60' of which extends through bearings 62 in the end walls 38 and 39 to the exterior where it is contained by plates 63 and 64, respectively. The plates 63 and 64 may be retained by the beams 48 and 49 and other appropriate structure to suitably anchor the over-all pattern of framework in position. A motor 65 mounted upon a motor support 66 drives a roller chain 67 through a sprocket 68 in order to rotate a sprocket 69 on the shaft 60', thereby to keep the agitator in operation and to assure that there is no bridging of the plastic material in the hopper during its passage downwardly through the opening 40. When the plastic material is a concrete grout, a mild agitation is sufficient to assure a constant flow downwardly of the hopper and out through the opening 40 at the bottom. To further assist in discharging the mix from the hopper there is provided a substantially conventional pneumatic vibrator 61 secured to the body of the hopper 35 as illustrated in FIGURE 5.

The plastic material passing downwardly from the opening falls upon an endless belt 70. As indicated the belt is supported throughout its upper reach upon the guide 43 which is especially necessary when the belt is loaded with plastic material to any appreciable depth. At one end the belt extends over a roller 71 rotating on a shaft 72 which is in turn carried by braces 73 of the frame in general. An adjusting roller 74 secured to the frame may serve as a means of placing a desirable amount of tension on the belt. At the end opposite the pulley 71 the belt is supported by a pulley 75 mounted on a shaft 76 in turn carried by vertical members 77 of the frame. A belt actuating motor 78 carried by beams 54 serves to operate the belt 70 through a drive belt 79 which extends over a belt pulley 80 on the motor and a similar belt pulley 81 on the shaft 76. The speed of movement of the upper reach of the belt 70 is determined by the speed of operation of the motor 78.

The belt 70 travels from a loading station 82 to a discharge station 83 immediately over the pulley 75. An idler pulley 74' holds the return reach of the belt at a removed location.

In the plate 43 is a hole 85 through which a mechanical agitator 86 mounted on a shaft 86' can be driven into engagement with the belt. A motor 87 mounted on that portion of the frame which carries the plate 43 drives the agitator through a belt 87' and a driven pulley 87''.

A second stage for movement of the plastic material is supplied by a belt 88. The belt 88 is an endless belt supported at one end by the pulley 89 and at the other end by the pulley 90. An idler pulley 91 serves to change the direction of travel of the belt as it leaves the pulley 90 and a second idler pulley 92 again changes the direction of travel of the belt 88 so that it travels directly to the pulley 89, as shown to good advantage in FIGURE 2 and in greater detail in FIGURE 3. The pulleys 89, 90, 91 and 92 are supported respectively by shafts 94, 95, 96 and 97 in cantilever bearings and appropriate brackets forming parts of the frame. An alternator indicated generally by the reference character 98 is in effect a composite pulley and engages with the belt 88 at the location shown in order to reverse the direction of travel of that portion of the belt as it moves from the pulley 89 to the pulley 90.

Motor power for driving or moving the belt is supplied by a motor 99 mounted upon a beam 100 at the top of the frame. The beam as shown is carried by the top of the column 50 at one end and also by columns 101 and 102. A drive pulley 103 operated by the motor 99 acts through a belt 104 to rotate a driven pulley 105 keyed by appropriate conventional means to the shaft 95 upon which the pulley 90 is also appropriately keyed. The motor 99 is of such character that it can be driven to move the belt 88 at a speed materially faster than movement of the belt 70 and if need be at speeds ten or twenty times faster.

The composite pulley or alternator 98 is shown in detail in FIGURE 6 and consists of a wheel 106 on one side keyed by means of a key 107 to shaft 108. A flange 109 extends around the perimeter at one edge of the wheel to confine the belt 88 on one side. A disc or plate 110 covers the opposite side of the wheel and forms part of a chamber 111.

Spaced from the wheel 106 on the shaft 108 is a second wheel 112 constructed in a manner similar to the wheel 106 but in reverse. The wheel 112 is keyed to the shaft 108 by means of a key 113 and is provided with a flange 114 on the outside for retaining the opposite edge of the belt 88. A disc or plate 115 on the wheel serves to form another side of the chamber 111. A cantilever bearing 116 carries the shaft 108 and supports it upon a beam 117 which in turn is carried in part by the column 102 and the casing 59.

Also forming a part of the alternator 98 is a wheel or pulley indicated generally by the reference character 120 which is an idler with respect to its mounting upon the shaft 108. The wheel 120 is provided with a hub 121 supported by bearings 122 and 123 upon the shaft 108. A web 124 supports a rim 125 over which a third endless belt 126 passes. The wheel 120 may be said to support one end of the endless belt 126 where it reverses completely the path of travel of the belt.

At its opposite end the endless belt 126 is supported by a pulley 127 carried upon a shaft 128. The shaft 128 is carried by a bushing or bracket 129 upon the column 102, the shaft extending through the bracket and having a driven pulley 130 keyed thereon and in turn driven by a belt 131 from a drive pulley 132 motivated by a motor 133. The motor 133 is mounted upon the beam 100 immediately adjacent the motor 99.

Figure 2:
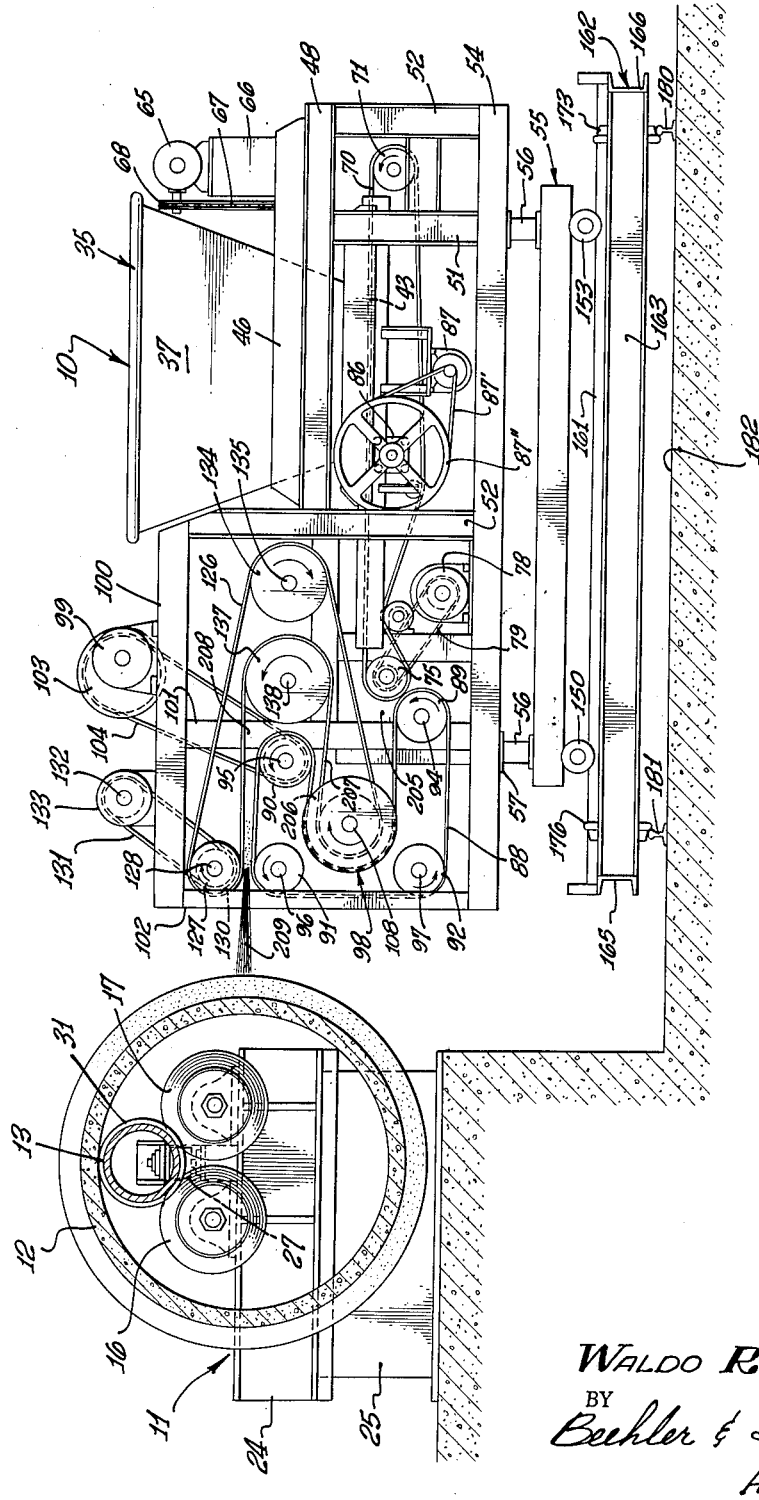
FIGURE 2 is a side elevational view of the coating machine together with a cross-sectional view of the pipe to be coated taken on the line 2—2 of FIGURE 1.

To give the endless belt 126 the path of travel illustrated in FIGURES 2 and 3, there is provided an idler pulley 134 mounted upon a shaft 135 in turn supported by a suitable bracket or bushing upon a beam 136 which is part of the frame, carried in part by columns 50 and 101.

A second alternator or discharge pulley 137 is mounted upon a shaft 138 in turn carried by a bracket or bushing secured to the beam 136.

As shown in greater detail in FIGURE 7, the discharge pulley 137 is keyed to the shaft 138 by means of a key 139, the key being secured in a hub 140 of the discharge pulley. A web 141 on the hub supports a rim 142 of special construction. As shown there is provided on the rim 142 opposite circumferential ridges 143, which are relatively wide and of appreciable depth and support the belt 126. Between the ridges is a wide deep groove 144 which receives the mass of concrete mix.

In order to provide for movement of the carriage 55 in a horizontal direction toward and away from the pipe 12, the carriage is mounted upon pairs of double flanged wheels 150, 151, 152 and 153. An axle 154 is rotatably secured in bearings 155 and 156 bolted to the underside of the carriage 55. Similarly an axle 157 is secured by similar bearings 158 to the underside of the carriage 55. As shown to good advantage in FIGURES 3 and 4, the flanged wheels ride upon a pair of rails 159 and 160.

Beneath the carriage 55 and supporting the rails 159 and 160 is a chassis 162. The chassis construction shown in FIGURES 1, 2, 3 and 4 consists of side channels 163 and 164 connected to end channels 165 and 166. Sections 167 and 168 extend longitudinally parallel to and spaced from the side channels 163 and 164, the last identified sections serving to support the rails 159 and 160. These last identified sections serve to support respectively members 169, 170, 171 and 172, opposite ends of which are supported by one or another of the side channels 163 and 164. This arrangement is clearly shown in FIGURE 1.

The chassis 162 is carried by a series of four flanged wheels 173, 174, 175 and 176. Flanged wheels 173 and 176 are separately mounted, each upon its own axle, not shown, so as to rotate freely when the chassis is moved. The flanged wheels 174 and 175, as shown in FIGURE 1 and FIGURE 3, are mounted upon a common axle 177 which is contained at one end in a bearing 178 fastened upon the end channel 166 and at the opposite end in a bearing 179 which supports the axle upon the member 165. Tracks 180 and 181 upon a track bed 182 provide a trackway upon which the flanged wheels 173, 174, 175 and 176 are adapted to carry the chassis and hence also the carriage 55 throughout the entire length of the pipe 12 and a distance beyond each end, as indicated in FIGURE 1. The chassis is power-driven and by way of example of a typical drive there is shown, and illustrated in particular in FIGURES 9 and 10, a suggested drive. The drive consists of a variable-speed motor 185 carried upon a base 186 which is carried by short beams 186' supported in turn by the side channel 164 and the section 168 parallel thereto. The motor operating through a drive shaft 187 and coupling 188 serves to operate a gear reducer unit 189 from which an output shaft 190 drives a sprocket 191. A chain 192 passes from the sprocket 191 downwardly around a sprocket 193 on the axle 177. As noted therefore the motor driving through the axle 177 and wheels 174 and 175 moves the chassis 162 from one end of the tracks to the other depending on the direction of rotation of the motor.

When a coating operation is to be performed, the pipe 12 is mounted by means of the mandrel 13 upon the rollers 14, 15, 16 and 17. At the same time the chassis 162 is moved from left to right along the tracks until the carriage 55 is approximately adjacent the spigot end of the pipe. The hopper 35 is filled with a sufficient quantity of plastic coating material and agitation and movement of the plastic mass in the hopper is commenced by rotation of the agitator 60 driven by operation of the motor 65. Agitation of the vibrator 61 at the same time further assists in moving the mix downwardly from the hopper. In succession the motors 133, 99 and 78 are operated to cause all of the endless belts 126, 88 and 70 to commence operation. Agitation of the belts 70 by the mechanical agitator serves to spread the mix of plastic coating material on the belt to the full width of the belt and at a uniform depth.

It should be noted at this point that the chassis and carriage are located with a considerable degree of certainty so that when the coating is commenced it will begin at the extremity of the spigot end of the pipe, if coating be started at that end, so that as the coating progresses, one pass of the apparatus will be sufficient to completely coat the pipe.

Some adjustment of the speeds of the motors 78, 99, and 133 will be requisite. Speeds which have been found operable are speeds wherein the belt 70 serving as a first stage travels 205 feet per minute, the belt 88 serving as a second stage travels 2650 feet per minute, and the belt 126 serving as a third stage travels 6600 feet per minute. However, these speeds may be increased to as much as the coating operation warrants.

As the plastic material proceeds to flow downwardly through the opening 40 at the bottom of the hopper, it falls upon the upper surface of the belt 70 at what has been indicated as the loading station 82. Because of the predetermined rate of travel of the belt and the location of the belt at a predetermined distance below the opening 40, an accurately measured amount of the plastic material will be delivered to the belt. This material is carried by the belt, confined by the guards on opposite sides to the discharge station 83. From this station the material will be centrifugally thrown upon what may be designated as a loading station 205 for a material carrying portion or reach of the endless belt 88. At this point the speed of travel of the material picks up and accelerates considerably by reason of the more rapid travel of the belt 88. The material falling upon the upper or material carrying reach of the belt 88 passes immediately into the alternator 98. Actually the material is directed into the lower portion of the substantially semi-annular chamber 111 (see FIGURE 6) and is carried around the chamber by centrifugal force confined therein by the presence of the turn of the belt 88 around the wheels 106 and 112. This reverses the direction of travel of the material 180 degrees so that as the material comes out of the upper portion of the chamber 111, its speed is increased to the speed of travel of the belt 88 or greater. Also during this portion of the cycle the centrifugal force causes the plastic coating material to spread substantially evenly over the surface of the belt. The discharge station of the belt 88 indicated by the reference character 206 on FIGURE 2 is at the emergence of the material from the alternator 98. The material thereafter will travel upon the upper side of the belt 126 at the location of a material carrying reach 207. Inasmuch as the belt 126 is traveling at twice the rate of the belt 88, the rate of travel of the material will be accelerated by movement of the belt 126. Inasmuch as the discharge pulley 137 is immediately adjacent the reach 207 and discharge station 206, the material will be thrown into the groove 144 thereof at the increased rate of speed. Presence of the ridges 143 confines and contains the speeded up material with the assistance of that portion of the belt 126 which covers the groove on the appropriate side of the discharge pulley. The speed of travel of the discharge pulley and the belt at this point accelerates the motion of the material to its greatest magnitude. Moreover, the centrifugal force applied to the coating material during this change of direction serves further to smooth out the material to a uniform depth on the belt. The material will emerge from the discharge pulley 137 at a discharge station 208 and, because of its high velocity, will travel virtually in a straight line as indicated by a stream 209 of material as it emerges from the series of belts just described. The stream 209 will impinge upon the surface of the pipe 12 at the spigot end during the initial stage of the coating operation. The amount of compaction of the material upon the surface of the pipe may be controlled to a degree by moving the carriage 55 manually, or by other conventional means, toward or away from the circumference of the pipe 12. Once the coating of the pipe has started, the motor 185 is set in operation at a specifically timed rate of travel. Meanwhile, rotation of the pipe has been commenced by initiation of operation of the motor 21. The coating of the pipe thereupon proceeds circumferentially about the spigot end of the pipe and proceeds gradually along the straight cylindrical section, thence along the sloping portion of the bell, and finally along the cylindrical portion of the bell until the stream 209 of coating material reaches the end. By reason of operating the moving parts by electric motors, suitably controlled as to speed by known conventional means, the thickness of the coating on the pipe can readily be controlled. This can be varied in part by the speed of rotation of the pipe, the speed of movement of the chassis along the tracks, and the velocity of the material feed belt 70 which in turn is subject to the speed of the motor which drives the belt to a degree. The density of the coating upon the pipe is a function of velocity and is also subject to some degree of control by the proximity of the belts to the circumference of the pipe. By reason of this fine degree of control, considerable versatility is built into the coating machine so that it is capable not only of varying the coating to an appreciable degree upon a pipe of selected diameter, depending upon the need, but also can be varied to a satisfactory degree on pipes of many different diameters which are accommodated by the mandrel and pipe-supporting mechanism.

It is also important to note that the endless belts which are depended upon to progressively accelerate the rate of travel of the material from a virtual stand-still to an extremely high velocity are compactly arranged and interrelated so that the parts form a compact unit. The interrelation is further such that even though substantial quantities of the plastic may escape throughout a prolonged operation, the material is nevertheless confined to a relatively limited space where suitable baffling can be arranged when necessary and desirable. The combination is also such that at the completion of the operation or during intervals of prolonged operation, the moving parts which transport the plastic may be quickly and thoroughly cleaned. Also by reason of the compact location and open arrangement of the moving parts, pulleys and belts can be readily removed when worn or needing servicing without it being necessary to dismantle any more parts than those which may actually be in need of servicing on a given occasion.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures and devices.

Having described my invention, what I claim as new and desire to secure by Letters Patent is:

1. A method for coating the exterior of a cylindrical object with a moist plastic material comprising rotating the object at a predetermined rate of rotation, moving measured quantities of said plastic material from a source thereof at rest to a predetermined initial velocity, substantially reversing the direction of travel of the material and increasing the velocity to at least 30 times the initial velocity, directing a stream of the material at said last identified velocity from a point of origin of said stream against the object, simultaneously moving the point of origin of said stream of material from one end to the other of said cylindrical object and establishing a working relationship among variables consisting of the velocity of the material, the distance between the pipe surface and the point of origin of said stream of said material at said maximum velocity, and the rate of travel of the point of origin of said stream from one end of the object to the other whereby to determine the density and depth of the material on the object.

2. A method for applying a moist plastic material to the exterior of a cylindrical object comprising rotating an object at a predetermined rate of rotation, moving measured quantities of said plastic material from a source thereof at rest to a predetermined initial velocity, reversing the direction of travel of the material and increasing the velocity substantially 12 times the initial velocity beginning at the point of reversal, again reversing the direction of travel of the material and simultaneously increasing the velocity rate to substantially 30 times said initial velocity rate at the point of said last identified reversal, directing a stream of the material when having said last identified velocity from a point of origin of said stream against the object, simultaneously moving the point of origin of said stream of material from one end to the other of said cylindrical object and establishing a relationship between the distance from the pipe surface to the point of origin of said stream of material and the maximum velocity and moving the point of origin of said stream of material at a selected rate from one end of the object to the other whereby to apply material to the object at a desired depth.

3. A method for applying a moist plastic material to the exterior of cylindrical objects comprising rotating an object at a predetermined rate of rotation, moving measured quantities of said plastic material from a source thereof at rest to predetermined initial velocity at a first stage, reversing the direction of travel of the material and increasing the velocity at a second stage to substantially 12 times the initial velocity, again reversing the direction of travel of the material and simultaneously increasing the velocity at a third stage to substantially 30 times said initial velocity, directing a stream of the material at said last identified velocity from a point of origin of said stream against the object, varying the relationship between the maximum velocity of the material and the distance between the pipe surface and the point of origin of said stream at maximum velocity whereby to establish the density of the material on the object, and moving the point of origin of said stream at a selected rate from one end of the object to the other.

4. A method for applying a moist plastic material to the exterior of cylindrical objects comprising rotating an object at a predetermined rate of rotation, moving measured quantities of said plastic material from a source thereof at rest to a predetermined initial velocity, reversing the direction of travel of the material and increasing the velocity to substantially 12 times the initial velocity, again reversing the direction of travel of the material and simultaneously increasing the velocity to substantially 30 times said initial velocity, directing a stream of material at said last identified velocity from a point of origin against the exterior of the object, simultaneously moving the point of origin of said stream of material from one end to the other of said cylindrical object varying the relationship between the maximum velocity of the material and the distance between the pipe surface and the point of origin of said stream of material at maximum velocity, and moving the point of origin of said stream of material at a selected rate from one end of the object to the other.

5. A machine for applying a moist plastic coating material of predetermined thickness to the exterior of a prestressed concrete pipe comprising a supporting area, a pipe supporting cradle on said area for rotatably supporting the concrete pipe on a substantially horizontal axis, a trackway on said area parallel to and spaced from the cradle and extending from end to end of the length of said pipe, a chassis having a rolling support on said trackway for movement from end to end of the trackway, and power means on said chassis adapted to move said chassis from end to end of said pipe, said chassis having a transverse support thereon extending normal to the axis of the cradle and the pipe, a carriage mounted on said transverse support for movement toward and away from said pipe, a hopper on said carriage for a plastic coating material mix to be applied to said pipe, an outlet at the lower end of the hopper, a first endless belt assembly on said carriage having one moving side below said outlet for reception of measured amounts of said plastic coating material and motor means connected to said belt moving said belt at an initial lowest speed, a second endless belt assembly on said carriage having one moving side with a loading end located adjacent a discharge end of the first belt assembly in position to receive said plastic coating material from said first belt assembly and motor means connected to said second belt assembly moving said second belt assembly at an intermediate speed, and a third endless belt assembly on said carriage having one moving side with a loading end located adjacent a discharge end of said second belt assembly in position to receive said plastic coating material from said second belt assembly and motor means on the carriage connected to the third belt assembly moving said third belt assembly at a relatively highest rate of speed, said third belt assembly having a discharge end in substantially horizontal alignment with a mid-portion of said pipe and in a diametrical line relative thereto whereby said plastic coating material is thrown against the pipe at the relatively highest velocity and at a constant rate progressively from end to end of the exterior of said pipe, the material carrying reach of each of said second and third endless belt assemblies having an arcuate direction change intermediate loading and discharge ends thereof whereby to reduce the lineal distance between the loading end of the second endless belt assembly and the discharge end of the third endless belt assembly.

6. A machine for applying a moist plastic coating material of predetermined thickness to the exterior of a prestressed concrete pipe comprising a supporting area, a pipe supporting cradle on said area for rotatably supporting the concrete pipe on a substantially horizontal axis, a trackway on said area parallel to and spaced from the cradle and extending from end to end of said pipe, a chassis on said trackway movable from end to end thereof, a carriage mounted on said chassis for movement toward and away from said cradle, a hopper on said carriage for the plastic coating material to be applied to said pipe, an outlet in the hopper, a first endless belt assembly on said carriage having one moving side adjacent said outlet for reception of said plastic coating material and means connected to said belt moving said belt at an initial lowest rate of speed, a second endless belt assembly on said carriage having one moving side with a loading end located adjacent a discharge end of the first belt assembly in position to receive said plastic coating material from said first belt assembly and means moving said second belt assembly at an intermediate speed, and a third endless belt assembly on said carriage having one moving side with a loading end located adjacent a discharge end of said second belt assembly in position to receive said plastic coating material from said second belt assembly and means moving said third belt assembly a relatively highest rate of speed, said third belt assembly having a discharge end in alignment with said pipe and means moving said chassis from one end to the other of said pipe whereby said plastic coating material is thrown against the exterior of the pipe at the relatively highest velocity and progressively from end to end of the pipe, the material carrying reach of each of said second and third endless belt assemblies having a direction change of about 180° intermediate loading and discharge ends whereby to spread the material across the belt by centrifugal force and to reduce the lineal distance between the loading end of the second belt assembly and the discharge end of the third belt assembly.

7. A machine for applying a moist plastic coating material of predetermined thickness to the exterior of a prestressed concrete pipe comprising a supporting area, a pipe supporting cradle on said area for rotatably supporting a concrete pipe on a substantially horizontal axis, a trackway on said area parallel to and spaced from the axis of the cradle and extending from end to end of said pipe, a chassis having a rolling support on said trackway for movement from end to end thereof, said chassis having a transverse trackway supported thereon extending normal to the axis of the cradle and the pipe, a carriage having a rolling support on said transverse trackway for movement toward and away from said pipe, means on said chassis operably associated with the rolling support thereof to move said chassis from end to end of the pipe and means on the carriage operably associated with the rolling support thereof to move said carriage toward and away from said pipe, a hopper on said carriage for said moist plastic coating material to be applied to said pipe, an outlet at the lower end of the hopper, a first endless belt assembly on said carriage having one moving side below said outlet for reception of measured amounts of said plastic coating material and motor means connected to said belt moving said belt at an initial lowest speed, a second endless belt assembly on said carriage having one moving side with a loading end located adjacent a discharge end of the first belt assembly in position to receive said plastic coating material from said first belt assembly and motor means connected to said second belt assembly moving said second belt assembly at an intermediate speed, and a third endless belt assembly on said carriage having one moving side with a loading end located adjacent a discharge end of said second belt assembly in position to receive said plastic coating material from said second belt assembly and motor means on the carriage connected to the third belt assembly moving said third belt assembly a relatively highest rate of speed, said third belt assembly having a discharge end in substantially horizontal alignment with a mid-portion of said pipe and in a diametrical line relative thereto whereby said plastic coating material is thrown against the exterior of the pipe at the relatively highest rate of speed and at a constant rate progressively from end to end of the pipe, mounting means on said carriage supporting said hopper and said belt assemblies having vertically adjustable supports for changing the level of the third belt assembly discharge end relative to the pipe.

8. A system for applying a moist plastic coating material of predetermined thickness to the exterior of a prestressed concrete pipe comprising a supporting area, a pipe supporting cradle on said area and a concrete pipe rotatably supported in said cradle on a substantially horizontal axis, a trackway on said area parallel to and spaced from the axis of the cradle and extending from end to end of said pipe, a chassis having a rolling support on said trackway for movement from end to end thereof, said chassis having a transverse trackway supported thereon extending normal to the axis of the cradle and the pipe, a carriage having a rolling support on said transverse trackway for movement toward and away from said cradle, a power plant on said chassis operably associated with the rolling support thereof to move said chassis from end to end of the pipe and a second power plant on the carriage operably associated with the rolling support thereof to move said carriage toward and away from said pipe, a hopper on said carriage for said plastic coating material to be applied to said pipe, an outlet at the lower end of the hopper, a first endless belt assembly on said carriage having one moving side below said outlet for reception of measured amounts of said plastic coating material and motor means connected to said belt moving said belt at an initial lowest speed, a second endless belt assembly on said carriage having one moving side with a loading end located adjacent a discharge end of the first belt assembly in position to receive said plastic coating material from said first belt assembly and motor means connected to said second belt assembly moving said second belt assembly at an intermediate speed, and a third endless belt assembly on said carriage having one moving side with a loading end located adjacent a discharge end of said second belt assembly in position to receive said plastic coating material from said second belt assembly and motor means on the carriage connected to the third belt assembly moving said third belt assembly at a relatively highest rate of speed, said third belt assembly having a discharge end in substantially horizontal alignment with a mid-portion of said pipe and in a diametrical line relative thereto, whereby said plastic coating material is thrown against the exterior of the pipe at a relatively highest rate of speed and at a constant rate progressively from end to end of the pipe, mounting means on said carriage supporting said hopper and said belt assemblies having vertically adjustable supports for changing the level of the discharge end of the third belt assembly relative to the pipe, and a common control for synchronizing the speed of said motor means and said power plants at will during the coating of said pipe.

9. A machine for applying a moist plastic coating material of predetermined thickness and density to the exterior of a prestressed concrete pipe comprising a rotating support rotatably supporting said pipe on a substantially horizontal axis, a carriage assembly having a longitudinally movable support for moving the carriage assembly throughout the length of the pipe, a hopper on the carriage assembly for plastic material having a discharge opening, a first endless belt assembly on the carriage assembly having an upper reach beneath said opening and motor means driving said belt at an initial lowest speed toward a discharge end thereof, a second endless belt assembly on the carriage assembly having an upper reach adjacent the discharge end of the first endless belt assembly for reception of said plastic therefrom, a motor means driving said second endless belt assembly at an intermediate speed, an alternator pulley device having a belt engaging perimeter and a belt thereon, and plates on opposite lateral sides located radially inwardly of the perimeter defining an annular space adjacent said perimeter for reception of said plastic coating material, said last defined belt being in engagement with said perimeter throughout not less than about 180° thereof and adapted to direct flow of said plastic coating material to said annular space, and a third endless belt assembly on the carriage including a belt having a loading reach adjacent a discharge end of the annular space in said alternator pulley device, means driving said third endless belt assembly at a speed higher than said intermediate speed, a discharge pulley in engagement with the belt of said third belt assembly throughout not less than about 180° thereof, and an annular recess in said discharge pulley receptive of said plastic coating material from the alternator pulley device and adapted to redirect the path of said plastic coating material at an increased velocity against the circumference of said pipe.

10. A machine for applying a moist plastic coating of predetermined thickness and density to the exterior of a prestressed concrete pipe comprising a rotating support rotatably supporting said pipe on a substantially horizontal axis, a carriage assembly having a longitudinally movable support for moving the carriage assembly throughout the length of the pipe, a hopper on the carriage assembly for plastic material having a discharge opening, a first endless belt assembly on the carriage assembly having an upper reach beneath said opening and motor means driving said belt at an initial lowest speed toward a discharge end thereof, a second endless belt assembly on the carriage assembly having an upper reach adjacent the discharge end of the first endless belt assembly for reception of said plastic therefrom, a motor means driving said second endless belt assembly at an intermediate speed, and an alternator pulley device comprising a shaft, an exterior pulley means having an inner annular recess rotatably mounted on the shaft, said pulley means being receptive of the belt of said second belt assembly throughout a substantial portion of the perimeter thereof, and said annular recess being receptive of said plastic material, and an inner pulley element rotatably mounted on the shaft within said outer pulley means and rotatable independently of the outer pulley means, said inner pulley element having a circumference thereof smaller than the outer pulley means and adapted to receive said plastic material from said annular recess, and a third endless belt assembly on the carriage including a belt passing over said inner pulley element with a loading reach thereof in alignment with the discharge end of said annular recess, motor means driving said third belt assembly at a speed higher than said second belt assembly, a discharge pulley comprising a shaft, a discharge pulley element in engagement with the belt of said third belt assembly and throughout substantially 180° thereof whereby said last belt has a discharge reach at a discharge side of said discharge pulley element, said discharge pulley element having an annular groove therein for reception of said plastic material, said discharge reach of said last belt being in alignment with said pipe whereby to direct impact of said plastic material upon the exterior circumference of said pipe.

11. A machine for applying a moist plastic coating material to the exterior of a prestressed concrete pipe comprising a supporting area, a pipe coating cradle on said area for supporting a concrete pipe rotatably therein, a trackway on said area parallel to and spaced from the axis of the cradle and extending throughout the length of said pipe, a chassis having a support on said trackway for movement from end to end of the length of the pipe, a power plant on said chassis operably associated with the support thereof to move said chassis along the pipe, a hopper on said chassis for a moist plastic coating material mix to be applied to said pipe, an outlet for the hopper, a first endless belt assembly on said chassis having one moving side below said outlet for reception of measured amounts of said plastic coating material and motor means connected to said belt moving said belt at an initial lowest speed, a second endless belt assembly on said chassis having one moving side with a loading end thereof located adjacent a discharge end of the first assembly in position to receive said plastic coating material from said first belt assembly and motor means connected to said second belt assembly moving said second belt assembly at an intermediate speed, and a third endless belt assembly on said chassis having portions thereof in adjacent parallel overlying relationship with said second belt assembly and having one moving side with a loading end located adjacent a discharge end of said second belt assembly in position to receive said plastic coating material from said second belt assembly and motor means on the chassis connected to the third belt assembly moving said third belt assembly at a relatively highest rate of speed, means at the loading ends respectively of the second and third belt assemblies confining said plastic coating material laterally, said third belt assembly having a discharge end in alignment with said pipe whereby said plastic coating material is thrown against the pipe at a relatively high velocity progressively from end to end of the exterior of said pipe, the material carrying reaches of said second and third belt assemblies each having an arcuate direction change between loading and discharge ends whereby to spread the material evenly across the belt by action of centrifugal force.

12. A machine for applying a moist plastic coating of predetermined thickness and density to the exterior of a prestressed concrete pipe comprising a rotating support rotatably supporting said pipe on a substantially horizontal axis, a carriage assembly having a longitudinally movable support and a laterally movable support for moving the carriage assembly throughout the length of the pipe and for moving the carriage assembly toward and away from the pipe, a hopper on the carriage assembly for plastic material having a rectangular opening at the bottom with the long dimension normal to the pipe, a first endless belt assembly on the carriage assembly having an upper reach beneath said opening and motor means driving said belt at an initial lowest speed toward a discharge end thereof, a second endless belt assembly on the carriage assembly having an upper reach adjacent the discharge end of the first endless belt assembly for reception of said plastic therefrom, a motor means driving said second endless belt assembly at an intermediate speed, and an alternator pulley device comprising a shaft, a pair of laterally spaced outer pulley elements rotatably mounted on the shaft receptive of side edges of the outer face of the belt assembly throughout a substantial portion of the perimeter thereof and an inner pulley element rotatably mounted on the shaft within said outer pulley element rotatably mounted on the shaft within said outer pulley elements and rotatable independently of the outer pulley elements, said inner pulley element having a circumference thereof smaller than the outer pulley elements and forming an annular space therebetween for reception of said plastic material, said inner pulley being adapted to reverse the direction of travel of said plastic material from a receiving end to a discharge end, and a third endless belt assembly on the carriage including a belt passing over said inner pulley element with an upper reach thereof in alignment with the discharge end of said second belt assembly adjacent said alternator pulley device, motor means driving said third belt assembly at a speed higher than said second belt assembly, a discharge pulley comprising a shaft, a discharge pulley element in engagement initially with an intermediate portion of the belt of said third belt assembly, said last belt having a reach on one side of the discharge pulley at a discharge side of said alternator pulley device, said discharge pulley element having annular recess means therein for reception of said plastic material, said recess means having a discharge side in alignment with said pipe whereby to direct impact of said plastic material upon the exterior circumference of said pipe.

13. A machine for applying a moist plastic coating of predetermined thickness and density to the exterior of a prestressed concrete pipe comprising a rotating support rotatably supporting said pipe on a substantially horizontal axis, a carriage assembly having a longitudinally movable support and a laterally movable support for moving the carriage assembly throughout the length of the pipe and for moving the carriage assembly toward and away from the pipe, a hopper on the carriage assembly for plastic material having a rectangular opening at the bottom with the long dimension normal to the pipe, a first endless belt assembly on the carriage assembly having an upper reach beneath said opening and motor means driving said belt at an initial lowest speed toward a discharge end thereof, a second endless belt assembly on the carriage assembly having an upper reach adjacent the discharge end of the first endless belt assembly for reception of said plastic therefrom, a motor means driving said second endless belt assembly at an intermediate speed and an alternator pulley device comprising a shaft, a pair of laterally spaced outer pulley elements rotatably mounted on the shaft receptive of side edges of the outer face of the belt of said second belt assembly throughout substantially 180° thereof and an inner pulley element rotatably mounted on the shaft within said outer pulley elements and rotatable independently of the outer pulley elements, said inner pulley element having a circumference thereof smaller than the outer pulley elements and forming an annular space therebetween for reception of said plastic material, said inner pulley being adapted to reverse the direction of travel of said plastic material from a receiving end to a discharge end, and a third endless belt assembly on the carriage including a belt passing over said inner pulley element with an upper reach thereof in alignment with the discharge end of said second belt assembly adjacent said alternator pulley device, motor means driving said third belt assembly at a speed higher than said second belt assembly, a discharge pulley device comprising a shaft, a pulley element in engagement with an intermediate portion of the belt of said third belt assembly and throughout 180° thereof whereby said last belt has a lower reach at a discharge side of said alternator pulley device and an upper reach at a discharge side of said discharge pulley device, said discharge pulley device having an annular groove therein for reception of said plastic material, said upper reach of the belt of said third belt assembly being in diametrical alignment with said pipe whereby to direct impact of said plastic material against the pipe and from end to end of the exterior of said pipe.

14. A machine for applying a moist plastic coating material to the exterior of a pipe comprising a cradle for rotatably supporting pipe to be coated, a container for plastic coating material having a discharge opening, and a series of endless belts driven at different speeds and located in positions wherein a belt of lowest speed has a material carrying reach with a loading end of said reach adjacent the discharge opening and a discharge end of said reach removed therefrom, a belt of intermediate speed has a material carrying reach with loading end of the reach adjacent and in directional alignment with the path of travel of the discharge end of the first belt and a discharge end of the reach removed therefrom, and a belt of highest speed has a material carrying reach with a loading end adjacent and in directional alignment with the path of travel of the discharge end of the belt of intermediate speed and a discharge end of the reach in alignment with the surface of the pipe, the material carrying reaches of said belts of intermediate and of highest speed each having a 180° direction change intermediate loading and discharge ends, and means for shifting the location of said series of belts relative to the length of the pipe whereby to enable discharge of said plastic coating material upon said pipe from end to end throughout the exterior thereof.

15. A machine for applying a moist plastic coating material of predetermined thickness and density to the exterior of a prestressed concrete pipe comprising a rotating support rotatably supporting said pipe on a substantially horizontal axis, a carriage assembly having a longitudinally movable support for moving the carriage assembly throughout the length of the pipe, a hopper on the carriage assembly for plastic coating material having a discharge opening, a first endless belt assembly on the carriage assembly having an upper reach beneath said opening and motor means driving said belt at an initial speed toward a discharge end thereof, a second endless belt assembly on the carriage assembly having an upper reach adjacent the discharge end of the first endless belt assembly for reception of said plastic coating material therefrom, a motor means driving said second endless belt assembly at an intermediate speed, an alternator pulley device having a belt engaging perimeter and a belt thereon, and laterally spaced plates located radially inwardly of the perimeter defining an annular space therein for reception of said plastic coating material, said last defined belt being in engagement with said perimeter throughout not less than about 180° thereof and adapted to direct flow of said plastic coating material thereto, and a third endless belt assembly on the carriage including a belt having a loading reach adjacent a discharge end of the annular space in said alternator pulley device, means driving said third endless belt assembly at a speed higher than said intermediate speed, whereby to redirect the path of said plastic coating material at an increased velocity against the circumference of said pipe.

16. A machine for applying a moist plastic coating material throughout the exterior of a pipe comprising a cradle for rotatably supporting a length of pipe to be coated, a container for plastic coating material having a discharge opening, and a series of endless belts driven individually at progressively greater rates of speed and located in positions wherein a first belt of lowest speed has a material carrying reach with a loading end adjacent the discharge opening and a discharge end removed therefrom, a belt of intermediate speed has a material carrying reach with a loading end adjacent and in directional alignment with the path of travel of the discharge end of the first belt and a discharge end removed therefrom, and a belt of highest speed has a material carrying reach with a discharge end in alignment with the surface of the pipe, the material carrying reach of the belt of highest speed having one portion traveling in the same direction and another portion traveling in a direction opposite to the direction of the material carrying reach of the belt of intermediate speed, and means for shifting the position of said series of belts relative to the length of the pipe whereby to enable discharge of said plastic coating material upon said pipe throughout the exterior thereof, the material carrying reach of said belt of intermediate speed having a direction change of about 180° at a location wherein material is retained thereon subject to centrifugal force whereby to spread the material evenly over the belt, the material carrying reach of the belt of highest speed having a loading end adjacent the end of the direction change of said belt of intermediate speed.

17. A machine for applying a moist plastic coating material throughout the exterior of a pipe comprising a cradle for rotatably supporting a length of pipe to be coated, a container for plastic coating material having a discharge opening, and a series of endless belts driven individually at progressively greater rates of speed and located in positions wherein a first belt of lowest speed has a material carrying reach with a loading end adjacent the discharge opening and a discharge end removed therefrom, a belt of intermediate speed has a material carrying reach with a loading end adjacent and in directional alignment with the path of travel of the discharge end of the first belt and a discharge end removed therefrom, and a belt of highest speed has a material carrying reach with a discharge end in alignment with the surface of the pipe, and means for shifting the position of said series of belts relative to the length of the pipe whereby to enable discharge of said plastic coating material upon said pipe throughout the exterior thereof, the material carrying reach of said belt of intermediate speed having a direction change of about 180° at a location wherein material is retained thereon subject to centrifugal force whereby to spread the material evenly over the belt, the material carrying reach of the belt of highest speed having a loading end adjacent the end of the direction change of said belt of intermediate speed, the material carrying reach of said belt of highest speed having a direction change of about 180° at a location wherein the material is retained thereon subject to centrifugal force whereby to further spread the material evenly over the belt prior to discharge upon the pipe.

18. A machine for applying a moist plastic coating material to the exterior of a pipe comprising a cradle for rotatably supporting a length of pipe to be coated, a container for moist plastic coating material having a discharge opening, a series of endless belts driven individually at progressively greater rates of speed and located in positions wherein a first belt of lowest speed has a material carrying reach with a loading end of said reach adjacent the discharge opening and a discharge end removed therefrom, and belting means of higher speed comprising a belt having a material carrying reach with a loading end of said reach in a location receptive of plastic coating material from the first belt, a reversal in direction in said reach, said belting means having a discharge end in alignment with the surface of the pipe, and means for shifting the position of said series of endless belts relative to the length of the pipe whereby to enable discharge of said plastic coating material upon said pipe from end to end of the entire exterior thereof.

19. A machine for applying a moist plastic coating material throughout the exterior of a pipe comprising a cradle for rotatably supporting a length of pipe to be coated, a container for plastic coating material having a discharge opening, and a series of endless belts driven individually at progressively greater rates of speed and located in positions wherein a first belt of lowest speed has a material carrying reach with a loading end adjacent the discharge opening and a discharge end removed therefrom, a belt of intermediate speed has a material carrying reach with a loading end adjacent and in alignment with the path of travel of the discharge end of the first belt and a discharge end removed therefrom, said discharge end of the belt of intermediate speed traveling in a different direction from the loading end, and wherein a belt of highest speed has a material carrying reach with a loading end adjacent the path of travel of the discharge end of the belt of intermediate speed and a discharge end traveling in a direction different from the loading end and in alignment with the surface of the pipe, the material carrying reach of the belt of highest speed having one portion traveling in the same direction and another portion traveling in a direction opposite to the direction of travel of the material carrying reach at the discharge end of the belt of intermediate speed, the material carrying reach of at least one of said last two belts having a direction change between the loading and discharge ends, and means for shifting the position of said series of belts relative to the length of the pipe whereby to enable discharge of said plastic coating material upon said pipe throughout the exterior thereof.

20. A machine for applying a moist plastic coating material to the exterior of a prestressed concrete pipe comprising a supporting area, a pipe coating cradle on said area for supporting a concrete pipe rotatably therein, a chassis having a support for movement from one end to the other of the pipe, a hopper on said chassis for a moist plastic mix of said coating material to be applied to said pipe, an outlet for the hopper, a first endless belt assembly on said chassis having one moving side below said outlet for reception of measured amounts of said plastic and motor means connected to said belt moving said belt at an initial lowest speed, a second endless belt assembly on said chassis having a material carrying reach comprising one moving side having a loading end located adjacent a discharge end of the first belt assembly in position to receive plastic coating material from said first belt assembly and motor means connected to said second belt assembly moving said second belt assembly at an intermediate speed, and a third endless belt assembly on said chassis havng a material carrying reach comprising one moving side having a loading end located adjacent a discharge end of said second belt assembly in position to receive plastic coating material from said second belt assembly and motor means on the chassis connected to the third belt assembly moving said third belt assembly at a relatively highest rate of speed, said third belt assembly having a discharge end in alignment with said pipe, the material carrying reaches of said second and third belt assemblies having in each instance an arcuate direction change, means respectively at the loading ends of the second and third endless belts confining said plastic coating material laterally, and means adapted to move said chassis relative to the length of said pipe whereby said plastic coating material is thrown against the pipe at the relatively highest rate of speed progressively from end to end of the exterior of said pipe.

21. A machine for applying a moist plastic coating of predetermined thickness and density to the exterior of a prestressed concrete pipe comprising a rotating support rotatably supporting said pipe on a substantially horizontal axis, a carriage assembly having a longitudinally movable support for moving the carriage assembly throughout the length of the pipe, a hopper on the carriage assembly for plastic material having a discharge opening, a first endless belt assembly on the carriage assembly having an upper reach adjacent said opening and motor means driving said belt at an initial lowest speed toward a discharge end thereof, a second endless belt assembly on the carriage assembly having an upper reach adjacent the discharge end of the first endless belt assembly for reception of said plastic therefrom, a motor means driving said second endless belt assembly at an intermediate speed, and an alternator pulley device comprising a shaft, a pair of laterally spaced outer pulley elements rotatably mounted on the shaft receptive of said edges of the belt of said second belt assembly and an inner pulley element rotatably mounted on the shaft within said outer pulley elements and rotatable independently of outer pulley elements, said inner pulley element having a circumference thereof smaller than the outer pulley elements forming an annular space therebetween for reception of said plastic material and adapted to change the direction of travel of said plastic material from a receiving end to a discharge end, and a third endless belt assembly on the carriage including a belt passing over said inner pulley element with a reach thereof in alignment with the discharge end of said second belt assembly adjacent said alternator pulley device, motor means driving said third belt assembly at a speed higher than said second belt assembly, a recessed discharge pulley in engagement with the belt of said third belt assembly whereby said last named belt assembly has a reach at a discharge side of said discharge pulley in alignment with said pipe whereby to direct impact of said plastic material against the exterior circumference of said pipe.

References Cited in the file of this patent

UNITED STATES PATENTS

| | | |
|---|---|---|
| 784,462 | Yancey | Mar. 7, 1905 |
| 2,168,329 | Earnshaw | Aug. 8, 1939 |
| 2,352,749 | Wills | July 4, 1944 |
| 2,362,677 | Stephens | Nov. 14, 1944 |
| 2,380,499 | Brend | July 31, 1945 |
| 2,669,436 | Smith | Feb. 16, 1954 |
| 2,809,866 | Vessels | Oct. 15, 1957 |

FOREIGN PATENTS

| | | |
|---|---|---|
| 837,936 | France | Feb. 23, 1939 |